(12) United States Patent
Ast et al.

(10) Patent No.: US 9,056,360 B2
(45) Date of Patent: Jun. 16, 2015

(54) MULTI-BLADE CUTTING AND DRILLING FINISHING TOOL

(75) Inventors: Holger Ast, Albstadt (DE); Lutfi Bozkurt, Winterlingen (DE); Peter Sommerfeldt, Hallungen (DE); Jochen Bitzer, Albstadt-Truchtelfingen (DE)

(73) Assignee: Guehring OHG, Albstadt (DE)

( * ) Notice: Subject to any disclaimer, the term of this patent is extended or adjusted under 35 U.S.C. 154(b) by 1059 days.

(21) Appl. No.: 13/145,720

(22) PCT Filed: Nov. 12, 2009

(86) PCT No.: PCT/DE2009/001590
§ 371 (c)(1),
(2), (4) Date: May 18, 2012

(87) PCT Pub. No.: WO2010/054637
PCT Pub. Date: May 20, 2010

(65) Prior Publication Data
US 2012/0321402 A1    Dec. 20, 2012

(30) Foreign Application Priority Data

Nov. 12, 2008 (DE) .......................... 10 2008 056 840

(51) Int. Cl.
| B23D 77/00 | (2006.01) |
| B23D 77/02 | (2006.01) |
| B23D 77/14 | (2006.01) |

(52) U.S. Cl.
CPC ............... *B23D 77/02* (2013.01); *Y10T 408/45* (2015.01); *Y10T 408/892* (2015.01); *Y10T 408/455* (2015.01); *Y10T 408/906* (2015.01); *B23D 77/14* (2013.01); *B23D 2277/02* (2013.01);
(Continued)

(58) Field of Classification Search
CPC ............................ B23D 77/006; B23D 77/003

USPC ............. 408/57, 59, 224, 117, 118, 145, 238, 408/239 A, 80, 81, 82, 83
See application file for complete search history.

(56) References Cited

U.S. PATENT DOCUMENTS 2,610,529 A *  9/1952  Atkinson ......................... 408/59
3,199,382 A     8/1965  Andreasson
(Continued)

FOREIGN PATENT DOCUMENTS

| JP | 01-060823 U | 4/1989 |
| JP | 2000-000719 | 1/2000 |
| JP | 2007-044846 | 2/2007 |

*Primary Examiner* — Daniel Howell
*Assistant Examiner* — Nicole N Ramos
(74) *Attorney, Agent, or Firm* — Burr & Brown, PLLC (57) ABSTRACT

Described is a multi-blade cutting and drilling finishing tool for machining deep or stepped bores. The tool comprises at least a first blade set having a nominal diameter and blades distributed essentially uniformly over the circumference. In order to make it easier to guide the tool along the central axis, a guiding strip set in the form of very accurately positioned cutting inserts is located axially behind the first blade set with respect to the axial direction of the tool in which the tool advances forward to machine the deep or stepped bores. Each of the cutting inserts is aligned with one of the blades of the first blade set in a direction parallel to an axis of the tool, and each of the cutting inserts has a nominal diameter which is smaller than the nominal diameter of the first blade set by essentially twice the size of a lubrication gap forming between the guiding strip set and the deep or stepped bores when the tool is used.

19 Claims, 8 Drawing Sheets

(52) U.S. Cl.
  CPC ..... *B23D2277/205* (2013.01); *B23D 2277/245* (2013.01); *B23D 2277/46* (2013.01)

(56) References Cited

U.S. PATENT DOCUMENTS

| | | | | |
|---|---|---|---|---|
| 3,216,107 | A * | 11/1965 | Andreasson | 407/1 |
| 3,543,613 | A * | 12/1970 | Obloy | 408/57 |
| 3,591,302 | A * | 7/1971 | Andreasson | 408/59 |
| 3,597,817 | A * | 8/1971 | Whalley | 407/11 |
| 4,705,435 | A * | 11/1987 | Christoffel | 408/59 |
| 5,221,165 | A * | 6/1993 | Goszczynski | 408/1 R |
| 5,282,705 | A * | 2/1994 | Shiga et al. | 408/211 |
| 5,326,195 | A * | 7/1994 | Brox | 407/32 |
| 5,391,023 | A * | 2/1995 | Basteck | 408/146 |
| 5,921,727 | A * | 7/1999 | Depperman | 408/144 |
| 6,033,159 | A * | 3/2000 | Kress et al. | 408/83 |
| 6,913,428 | B2 * | 7/2005 | Kress et al. | 408/144 |
| 7,717,651 | B2 * | 5/2010 | Haberle et al. | 408/24 |
| 7,896,588 | B2 * | 3/2011 | Ananolli | 408/81 |
| 2007/0172322 | A1 * | 7/2007 | Haberle et al. | 408/22 |
| 2009/0116913 | A1 * | 5/2009 | Xiao et al. | 408/1 R |

* cited by examiner

MULTI-BLADE CUTTING AND DRILLING FINISHING TOOL

The invention relates to a multi-blade cutting and drilling finishing tool or fine machining tool according to the introductory clause of claim 1.

Such tools are often designed as so-called stepped reamers, and can successfully be used to generate very accurately axially staggered bores of varying diameter with a single working stroke, which are additionally recessed relatively deeply in a work piece.

Accordingly, the most stringent of requirements are placed on such a tool in terms of stability and machining accuracy. One special difficulty in designing such high-performance reamers is here that the dimensional stability of the tool and machining accuracy of the blades must also be present even given significant working depths. For example, when manufacturing bores for accommodating hydraulic piston slide valves, e.g., which are required in control blocks of motor vehicle controllers, it is necessary to bridge a gap of more than 150 mm extending from the fixing point of the tool to the foremost blade set, wherein the smallest nominal, diameter of the bore to be machined only measures about 11 mm, for instance. On the other hand, the bores to be fabricated with such a tool must be manufactured with a high surface quality and extremely accurate concentricity throughout, while maintaining very narrow tolerances, so that special measures are required to ensure that the stepped bores with a significant axial distance between them have very narrow diameter tolerances of only several μm and cylinder position tolerances also lying in the μm range.

In order to be able to realize the accurate alignment of the bore or stepped bores while remaining in compliance with the narrow dimensional and positional tolerances, it is common to stabilize the blades often distributed uniformly over the circumference of the tool by means of guiding strips lying in between. For example, Document DE 197 19 893 A1 describes such a tool.

However, it turns out that a reamer configured in this way is unable to fabricate deep bores or stepped bores having axially widely spaced apart machining surfaces with the high accuracy described above. Apart from that, the disadvantage to such a known structural design is that the guiding strips significantly limit flexibility when configuring the tool, since these guiding strips take up a relatively great deal of installation space in the circumferential direction.

Therefore, the object of the invention is to provide a preferably rotary driven, multi-blade cutting and drilling finishing tool, in particular a reamer, for machining deep or stepped bores, which can be used to fabricate bores that lie axially relatively deep in the work piece or are spaced wide apart, and have diameters ranging down to relatively small with the highest accuracy, dimensional stability and surface quality, while maintaining a structural design that offers the maximum possible flexibility in terms of mounting the sets of blades.

This object is achieved with a multi-blade cutting and drilling finishing tool or fine machining tool for machining deep or stepped bores, the tool comprising at least a first blade set and a guiding strip set axially behind the first blade set with respect to the axial direction of the tool in which the tool advances forward to machine deep or stepped bores, the guiding strip set comprising very accurately positioned cutting inserts, each cutting insert aligned with one of the blades of the first blade set in a direction parallel to an axis of the tool, and each cutting insert having a nominal diameter that is smaller than the nominal diameter of the first blade set by essentially twice the lubrication gap that forms between the guiding strip set and the deep or stepped bores when using the tool.

According to the invention, use is made of a specially designed guiding strip set that is located behind the blade set in the advancing direction—or when configured as a stepped tool between two sets of blades with differing nominal diameters—and formed by cutting inserts that each are axially flush with the blades in the adjacent blade set in the advancing direction of the tool. The preferably cylindrically ground cutting inserts of the guiding strip set have a nominal diameter in the $1/1000$ range that is smaller than the nominal diameter of the adjacent blade set in the advancing direction. This difference in nominal diameter measures on the order of twice the lubrication gap formed while using the tool relative to the bore wall just machined, for example ranging between about 11 and 17 μm given a tool with a nominal diameter of approx. 13 mm. Therefore, this difference in nominal diameters is essentially adjusted in such a way that it can be filled by a lubrication film of used coolant/lubricant, so that the guiding strip set can be effectively used to stabilize the work piece.

Because highly accurately placed blade sets of the guide strip set are axially flush with the blades in the adjacent blade set in the advancing direction of the tool, but axially offset relative to these blades, advantageous use is made of the axial installation space that is present anyway between the blade set and tool shank or—when configured as a stepped tool between the sets of blades—the reamer. This permits an increase in the number of blades in the area of the at least one blade set, which further enhances flexibility when configuring the tool to reflect the respective cutting problem at issue.

In particular when the at least one blade set is fitted with an even number of blades, and these blades are arranged essentially uniformly over the circumference, the resultant special advantage is that a respective blade set of the guiding strip set lies essentially diametrically opposite a blade in the adjacent blade set in the advancing direction, making it possible to guide the sets of blades in an especially efficient way. The cutting inserts of the guiding strip set are extremely space-saving, and can essentially be constructed like the blades of the actual sets of blades of the tool. This additionally simplifies the manufacture of the tool.

Advantageous further developments are the subject of the subclaims

It has been found that setting the nominal diameter of the guiding strip set to values according to claim 2 yields especially good results when supplying coolants/lubricants with conventional parameters (consistency, density, speed, pressure). The difference between the nominal diameter for the guide strip set on the one hand and adjacent blade set in the advancing direction on the other can vary depending on whether wet or dry machining (MS technology) is selected, and as a function of the pressure of the used coolant/lubricant. For example, at a nominal diameter for the blade set of 13 mm, the nominal diameter difference can measure between 11 and 17 μm.

To achieve an especially good stabilizing effect of the guiding strip set, i.e., to ensure an especially good guiding function, it is advantageous that the axial length of the blade sets of the guiding strip set not be allowed to become too short. However, it has been found that the axial length can readily be limited to the length of the adjacent blade set.

The configuration of the fine machining tool according to the invention even makes it possible to give the tool a modular structural design without sacrificing any of the machining accuracy of the tool. This further elevates the flexibility with regard to the tool configuration.

The further development described in claim 5 yields an especially advantageous structural design for the tool. This structural design makes it possible to construct a tool for a wide variety of applications with minimal retrofitting outlay. Since the first tool module is detachably joined with the other tool module, the guiding strip set must perform an especially important function, since it is able to compensate for the weakening of the tool that naturally arises from coupling the modules in an especially effective manner.

It has even been found that the structural design according to the invention or the configuration and arrangement of the guiding strip set according to the invention makes it possible to furnish the forerunning tool section of the tool with at least one additional blade set, which can also be stabilized by the guiding strip set. In particular when this additional blade set is situated on a replaceable module, this significantly enhances even further the flexibility in configuring the tool.

The cutting inserts of the guiding strip set and/or at least one of the present cutting inserts are advantageously comprised of tool tips having a PCD (polycrystalline diamond) plating. Such tool tips fitted with PCD can be given an extremely dimensionally accurate design, and take up relatively little installation space, in particular when directly soldered with the substrate. In has surprisingly been discovered that these PCD fitted tool tips are also functionally eminently suitable in the vicinity of the guiding strip set, even if they only exhibit a thickness in the mm range, so that the stabilizing functions described above are reliably sustained.

Tool production is further simplified if the cutting inserts of the guiding strip set and/or at least one of the present blade sets are aligned axially parallel. However, let it be emphasized at this juncture that the tool basically need not have straight grooves. Rather, it can also be equipped with blades that are at least slightly tilted in or against the rotational direction of the tool.

Tool performance can be specially optimized by means of an internal coolant/lubricant supply. This type of internal coolant/lubricant supply ensures that not just the blade sets, but also the guiding strip set is continuously supplied with enough coolant/lubricant, so that the stabilizing function of the guiding strip set can be reliably sustained. Such an internal coolant/lubricant supply is especially advantageous for dry machining, i.e., when using MQL (minimum quantity lubrication) technology.

A sufficient number of openings is advantageously allocated to each blade set. At least one opening of the coolant/lubricant supply can even be allocated to each blade in the blade set. Since the guiding strip set usually closely adjoins the adjacent blade set in the advancing direction of the tool, it is even enough to supply axially flush cutting inserts of the blade set and adjacent guiding strip set with coolant/lubricant via a shared opening.

The further development of claim 14 yields an especially dimensionally stable coupling of the tool with a tool holding fixture of a tool system, since the chucking flange stabilizes the axial alignment of the tool in addition to the centering extension or hollow shank taper (HST).

Exemplary embodiments of the invention will, be explained in greater detail below based on schematic drawings. Shown on.

Figure 1:
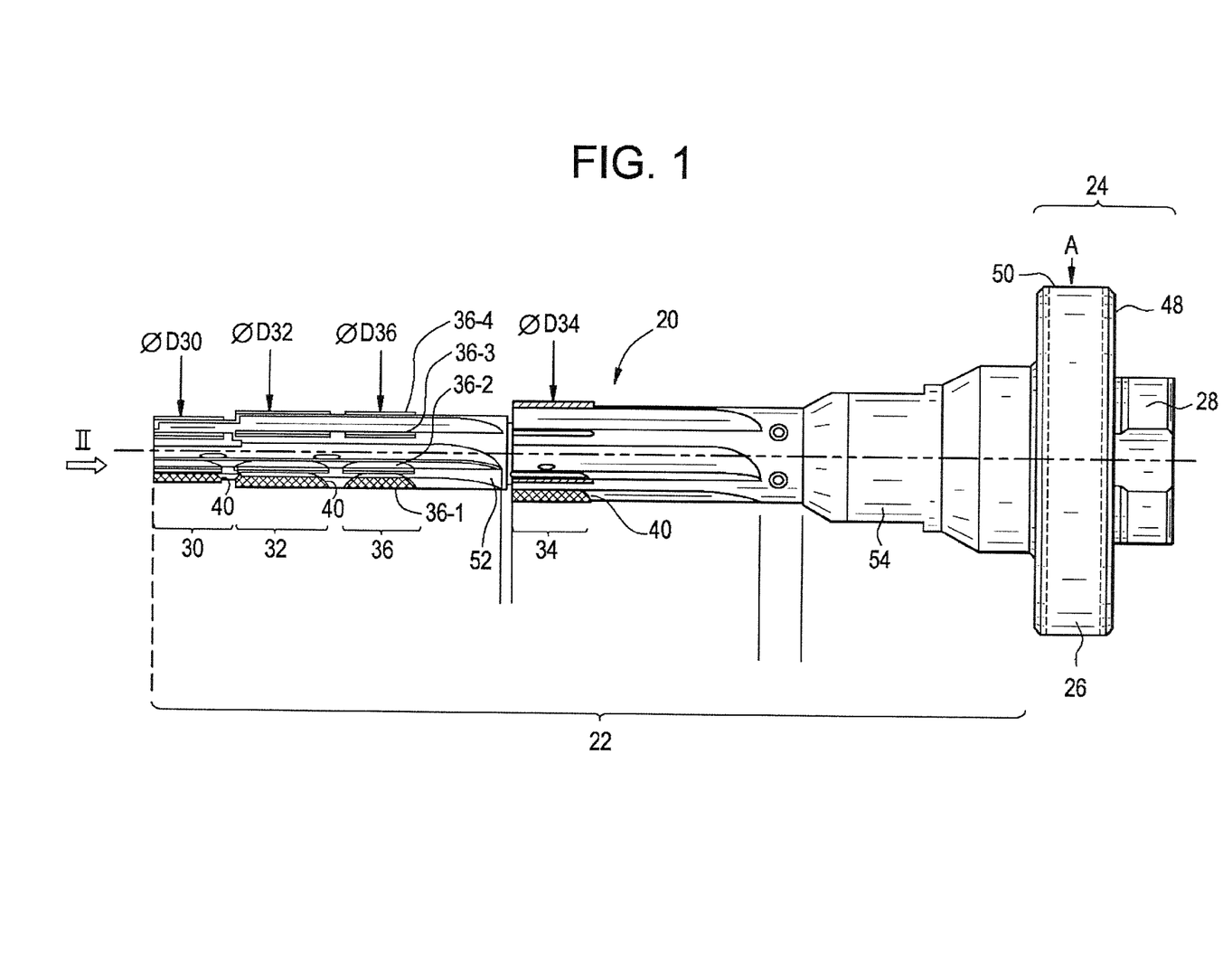
FIG. 1 is a slightly magnified side view of an embodiment of the multi-blade drilling finishing tool.

A multi-blade cutting and rotationally driven drilling finishing tool configured as a stepped reamer is labeled with reference number 20 on FIG. 1. This tool is used for accurately machining stepped bores, for example those required in control block casings of hydraulic controllers in automotive technology for accommodating piston slide valves. The distinctive feature of these bores lies in the fact that they are axially spaced relatively far apart, and exhibit exceedingly narrow positional tolerances. As a result, the tool must be introduced relatively deeply into the work piece, and still be able to produce bores with the highest surface quality and dimensional stability.

The tool 20 has a shank 22 and clamping section 24, which in the exemplary embodiment shown exhibits a clamping flange 26 and centering extension 28. For example, the stepped reamer according to FIG. 1 has a length of approx. 160 mm and a shank diameter on the order of about 16 mm. In the exemplary embodiment depicted, the reamer is fitted with three sets of blades 30, 32 and 34, wherein the first blade set 30 has a nominal diameter D30, the second blade set 32 a somewhat larger nominal diameter D32, and the third blade set 34 and even larger nominal diameter D34. For example, D30 measures about 11 mm, D32 about 13 mm, and D34 about 17 mm. All nominal diameters have exceedingly narrow tolerances, for example between 0 and −0.003 mm. For example, the axial distance between the first blade set 30 and third blade set 34 measures about 60 mm, while the distance between the second blade set 32 and third blade set 34 measures about 30 mm.

In order that the stepped bores to be fabricated with the tool can be manufactured with the highest level of accuracy and surface quality, a supporting strip set 36 is situated between the second blade set 32 and third blade set 34, and has a nominal diameter D36 measuring slightly less than the nominal diameter D32 of the second blade set 32. At a nominal diameter of the second blade set D32 of about 13 mm, the nominal diameter D36 of the guiding strip set 36 is 14±3 µm smaller than the nominal diameter D32 of the adjacent blade set 32 in the advancing direction of the tool.

The supporting strip set is comprised of cutting inserts 36-1, 36-2 to 36-$n$, wherein $n$ represents the number of blades in blade sets 30, 32 and 34 distributed uniformly over the circumference. The cutting inserts 36-1 to 36-$n$ are preferably cylindrically ground, wherein a round phase is preferably partially ground on the leading edge.

Let it be emphasized at this juncture already that the cylindrical ground surface is not absolutely necessary. It is equally possible to partially grind the cutting inserts 36-1 to 36-$n$ similarly to cutting, or in such a way as to yield a negative secondary cutting edge with a clearance angle. However, it is critical that the cutting inserts 36-1 to 36-$n$ and machining or molding process be so accurate as to result in a homogeneous lubrication gap over the entire length L36 (see FIG. 3), over which the tool can additionally and effectively be guided.

Given a tool configured according to FIGS. 1 to 5, the blade sets 30, 32 and 34 are each fitted with six blades, each arranged at an angular distance of 60° relative to each other. Since the cutting inserts 36-1 to 36-6 are aligned with one of the blades of blade sets 30, 32 and 34 in a direction parallel to an axis of the tool, a stabilizing lubrication gap of the supporting strip set 36 lies diametrically opposite and slightly axially offset relative to each blade of the blade sets, in particular of blade set 32, so that evasive movements of the tool induced by cutting forces can be effectively counteracted.

In the exemplary embodiment shown, the blade sets 30, 32 and 34 are also fitted with cutting inserts, which exhibit a structural design similar to that of the cutting inserts 36-1 to **36-*n* of the supporting strip set 36. Specifically, these cutting inserts 30-1 to 30-*n*, 32-1 to 32-*n* and 34-1 to 34-*n* can have a thickness T38 (see FIG. 7) in the range from about 0.75-1.5 mm. The cutting inserts 30-1 to 30-*n*, 32-1 to 32-*n* and 34-1 to 34-*n*** can be comprised of PCE (polycrystalline diamond) fitted cutting tips, in which a steel carrier which can have a thickness of about 0.5 mm, supports a PCD tool tip which can have a thickness TPKD measuring 0.5 mm.

The cutting inserts 30-1 to 30-6, 32-1 to 32-6 and 34-1 to 34-6 are each accommodated in a pocket 40 in the tool shank 22 in such a way that the respective secondary cutting edge 42 lies in a plane that runs through the tool axis 44. This geometric arrangement can best be discerned from FIG. 2, which additionally reveals the clearance angle α of the blades or cutting inserts of the blade set 30, 32 and 34.

Figure 3:
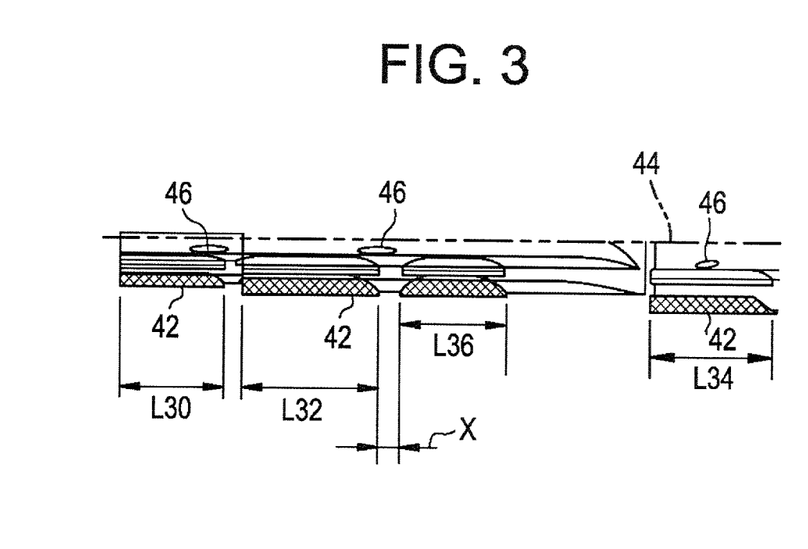
FIG. 3 is a detail of the blade sets of the tool according to FIG. 1 in a somewhat magnified view.
Figure 4:
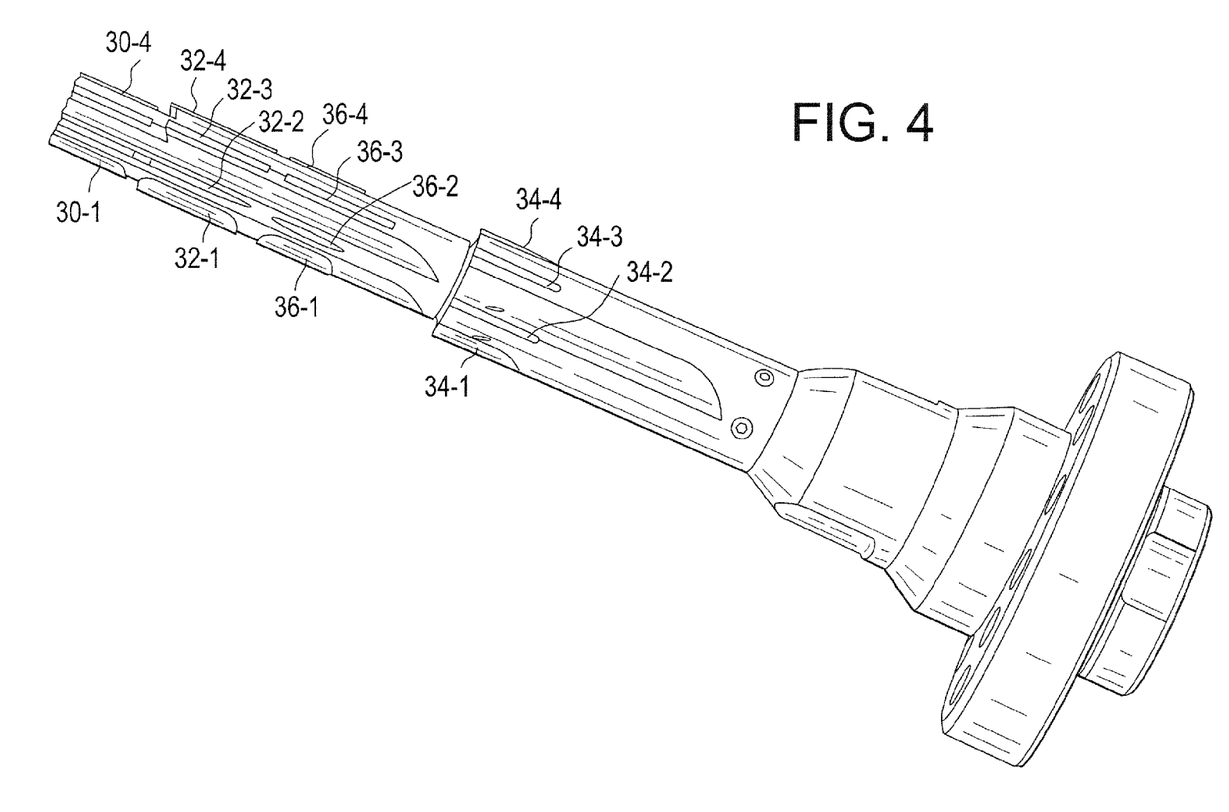
FIG. 4 is a perspective view of the to according to FIGS. 1 to 3.
Figure 5:
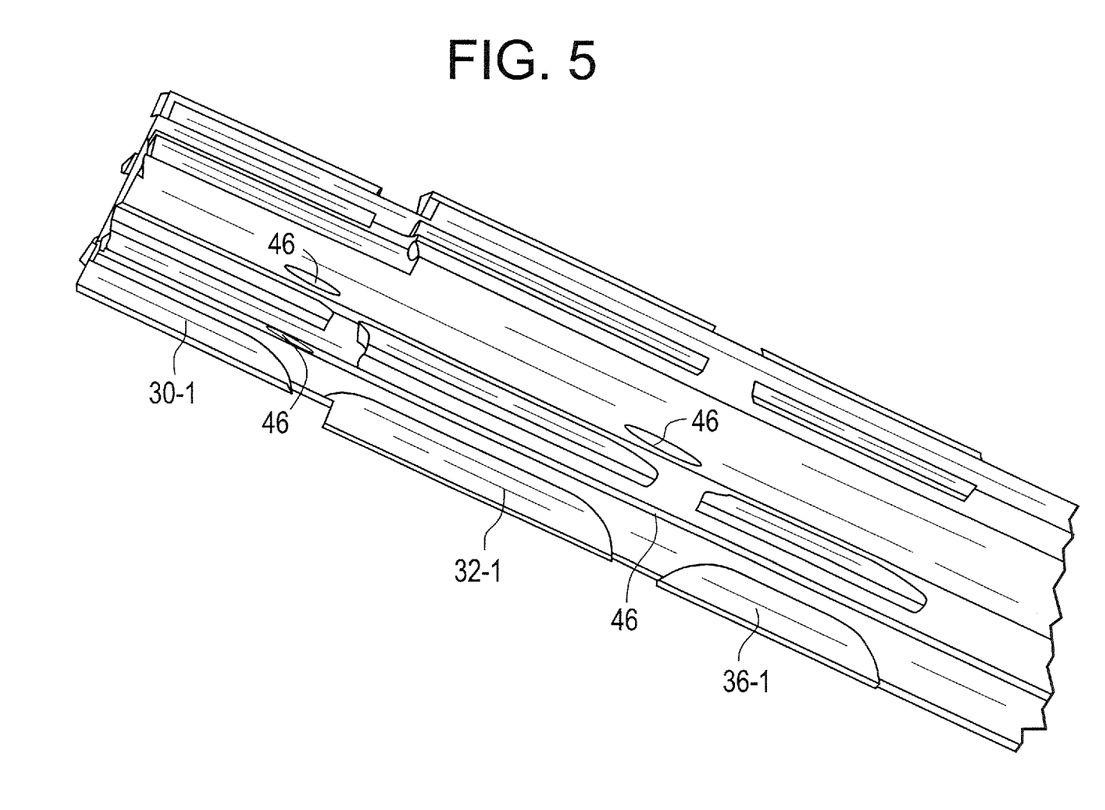
FIG. 5 is a detail of the tool according to FIG. 4 in a somewhat magnified view.

As evident from FIG. 3, the cutting inserts of the blade set 30, 32 and 34 along with the supporting strips 36-1 to 36-6 configured like cutting edges are chamfered at the axial front and rear ends. As may further be gleaned from FIG. 3, the axial distance X between the cutting inserts of the blade set 32 and supporting strips of the supporting strip set 36 only measures a few mm, for example between 2 and 3 mm, and the length L36 of the supporting strip set 36 lies on the order of the length L32 of the adjacent blade set 32 in the advancing direction of the tool 20.

In the exemplary embodiment shown, the axial length L32 of the blade set 32 measures 16 mm, for example, while the axial length L36 of the supporting strip set 36 essentially measures 12 mm.

The tool shank 22 carrying the blade sets 30, 32 and 34 along with the supporting strip set 36 is made out of a tool steel. A quenched and tempered steel, such as 50CrV4, is used as the material for the substrate of the cutting inserts 30-1 to 30-6, 32-1 to 32-6, 34-1 to 34-6, as well as for supporting strips 36-1 to 36-6.

The tool 20 has a coolant/lubricant supply, in which supply specifically takes place by way of internal coolant/lubricant channels. Reference number 46 denotes openings in branch channels, which run inclined to the axis 44 of the tool 20 proceeding from a centric internal bore of the tool, and empty into the pockets 40 of the tool shank 22 in proximity to the cutting inserts. By suitably selecting the openings 46 allocated to the blade set 32, the coolant/lubricant exiting these openings can be used to generate an effective lubricant film in the region of the supporting strip set 36.

Figure 2:
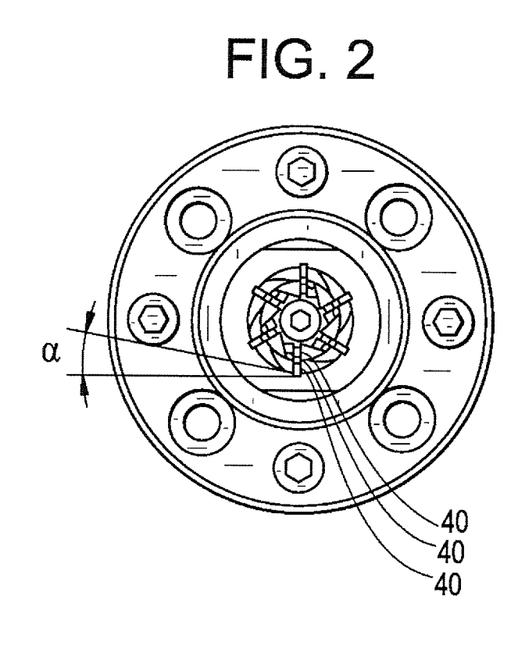
FIG. 2 is the view according to "II" on FIG. 1.

As may further be gleaned from FIGS. 1 to 3, all nominal diameters of the blade sets on the one hand along with the supporting strip set 36 on the other are machined in such a way as to comply with a running accuracy relative to a face 48 of the clamping flange 26 within a tolerance of 0.003 mm. The same holds true for the running accuracy of this nominal diameter in relation to a cylindrical surface 50 of the clamping flange 26.

Figure 6:
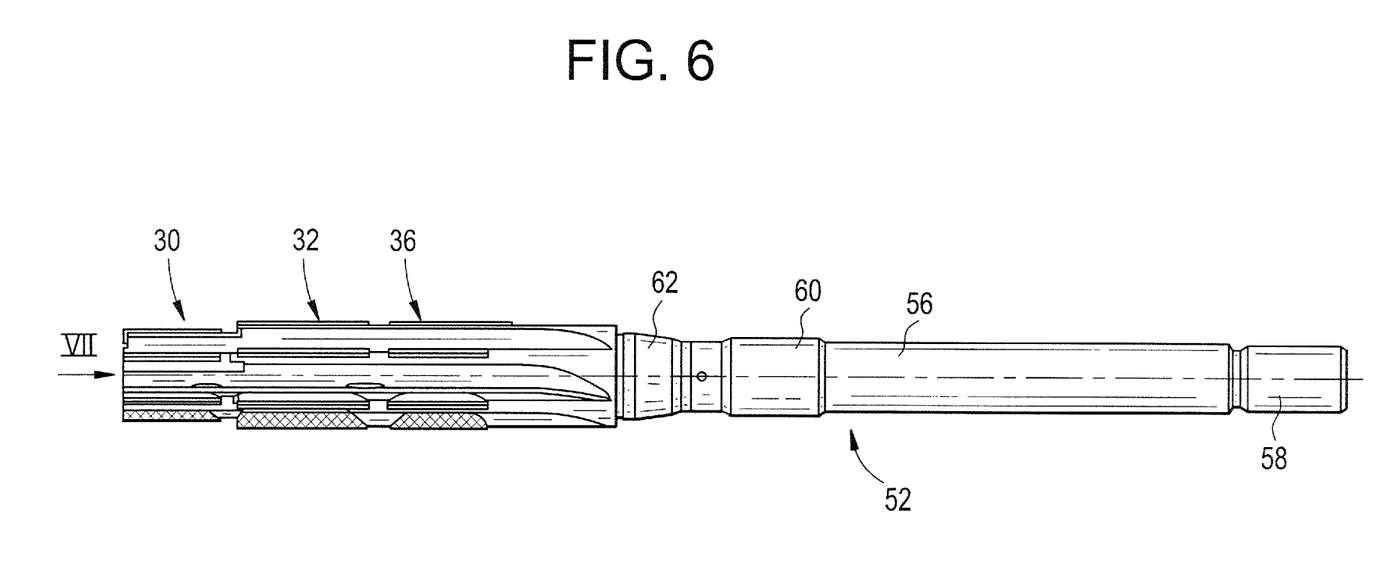
FIG. 6 is a somewhat magnified side view of a tool module used in the tool according to FIG. 1.

In addition, the tool 20 depicted on FIGS. 1 to 3 is modular in design, which will be explained in greater detail below drawing reference to FIGS. 6 to 8.

As evident, the blade sets 30 and 32 along with the supporting strip set 36 are formed on a first tool module 52, which is centered and axially coupled in a rotatably fixed manner with a second tool module 54. The first tool module 52 carrying the blade sets 30 and 32 as well as the supporting strip set 36 is shown on FIG. 6, and has a shank extension 56 bonded with the second tool module 54 by way of a threaded section 58. The two tool modules 52 and 54 are centered relative to each other via two pairs of fitting surfaces. On the one hand, a cylindrical section 60 acts in conjunction with a complementary, preferably ground internal recess in the second tool module 54. On the other hand, a cone section 62 is used for purposes of centered clamping. The first tool module 52 has a central bore (not shown in any greater detail) for the coolant/lubricant supply of the blade sets 30, 32 and 34 as well as the supporting strip set 36.

Figure 7:
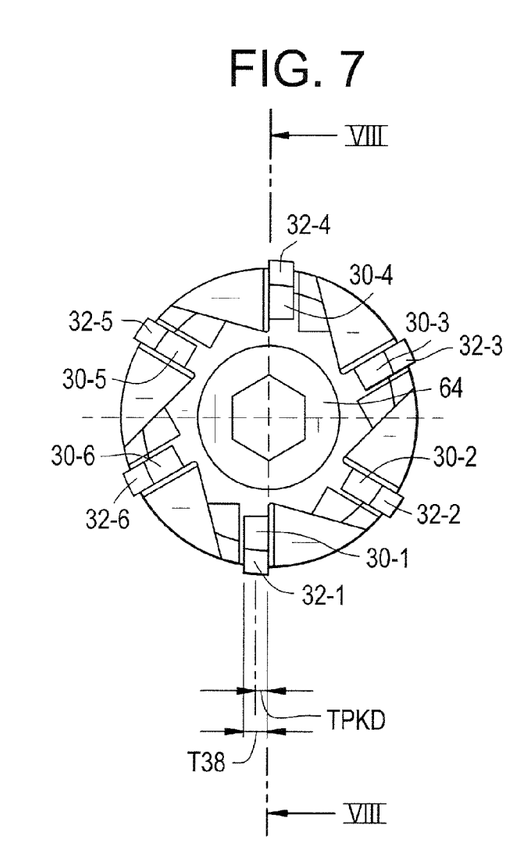
FIG. 7 is a magnified view according to "VII" on FIG. 6.
Figure 8:
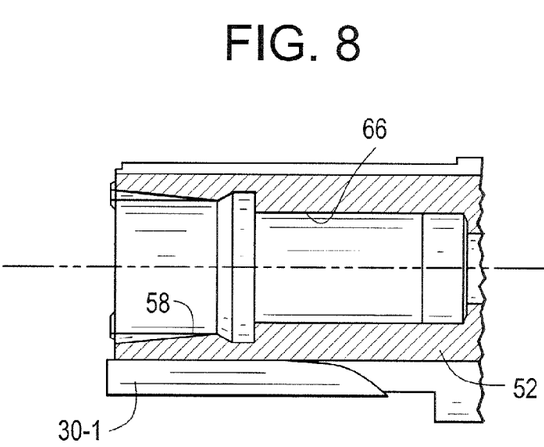
FIG. 8 is the sectional view according to "VIII-VIII" on FIG. 7.
Figure 9:
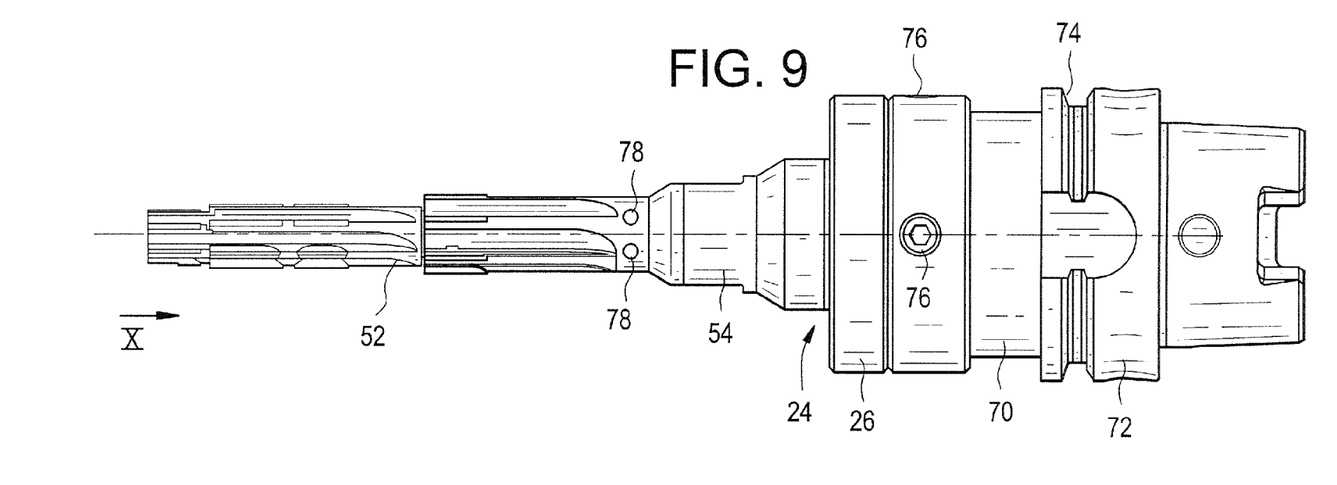
FIG. 9 is the side view of another embodiment of the tool.

FIGS. 8 and 9 illustrate a distinctive feature of the first tool module 52. The top view according to FIG. 7 depicts an expanding screw 64 that is frontally screwable into the tool module 52, which can be screwed into a female thread on the tool module 52, and abuts a conical counter-fitting surface 68 with an outer cone in the process. This makes it possible to introduce fine radial adjustments in the blades 30-1 to 30-6.

Finally, it can be gleaned from the view according to FIG. 7 that the cutting inserts 30-1 to **30-*n* of the first blade set 30 are precisely flush with the cutting inserts 32-1 to 32-*n***, and than they are circumferentially spaced uniformly apart from each other.

Figure 10:
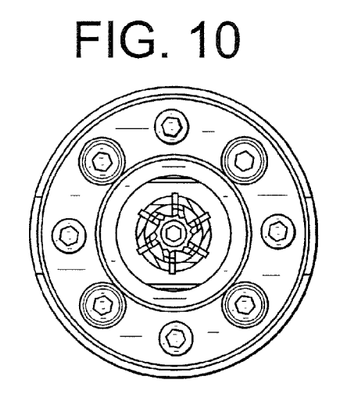
FIG. 10 is the view according to "X" on FIG. 9.
Figure 11:
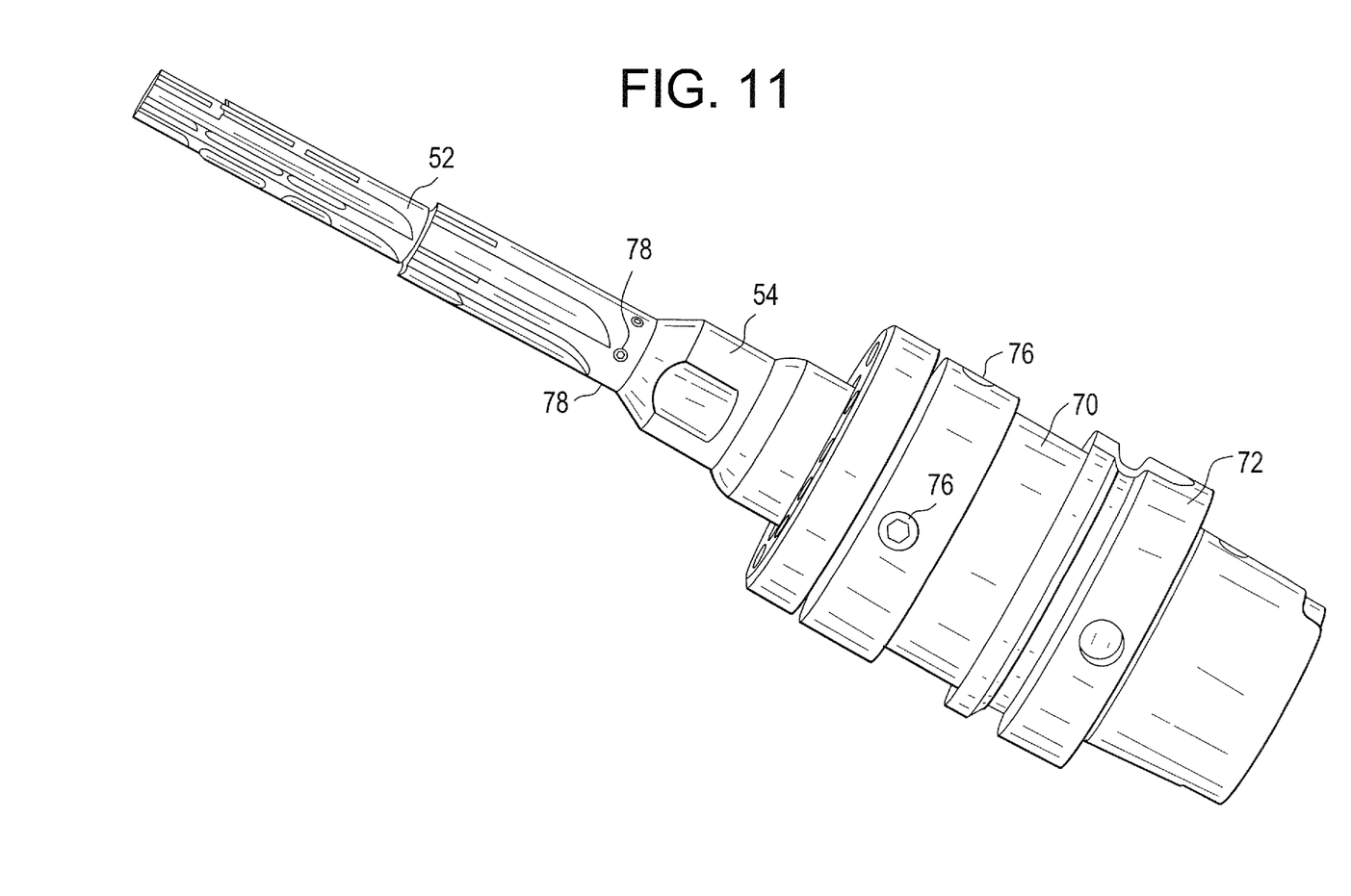
FIG. 11 is a perspective view of the tool according to FIG. 9.

FIGS. 9 to 11 present a completely multi-blade cutting and drilling finishing tool configured as a stepped reamer, wherein the tool modules 52 and 54 are coupled via the clamping section 24 with clamping flange 26 to two additional modules 70 and 74. The module 70 represents a compensating adapter, while the module 72 represents a so-called (HST) hollow shank taper adapter, which can be used to couple the tool 20 to a tool holder of a machine spindle. Reference number 74 denotes a gripper groove for engaging a tool changing system.

Reference number 76 denotes threaded pins with which the tool can be balanced. Reference number 78 denotes additional threaded pins on the second tool module 54, with which the tool can be precision balanced.

Of course, deviations from the described exemplary embodiments are possible without, departing from the underlying idea of the invention. For example, the essentially axial alignment between the blades of blade set 32 and supporting strip set 36 can be sustained even if the blades are configured with a slight left or right-handed twist, i.e., if the cutting angle of the secondary cutting edge preferably deviates slightly from 0°. Instead of the tool having a straight groove, the grooves are then positively or negatively slightly inclined relative to the axis.

The blade sets 30, 32 and 34 are also not necessarily configured in such a way as to form the blades on cutting inserts. The blades can also be designed as a single piece with a blade carrier, which then preferably consists of a hard material, e.g., solid carbide.

Other materials can also be used as the material for the first tool module 52 and/or the second tool module 54, including in particular varying materials as well.

The supporting strips of the supporting strip set 36 are cylindrically ground in the described exemplary embodiments. This ground surface can also be modified in such a way as to yield an expansion of the lubrication gap in the rotational direction of the tool.

The ground surface of the cutting inserts in the blade sets 30, 32 and 34 was not described in detail. Use can here be made of conventional ground surfaces, which as a rule are utilized in high-performance reamers, and need not be extensively described here. However, it may be advantageous, for example, to slightly taper the diameter of the PCD-plated cutting inserts lengthwise in an axial direction, specifically within the $1/1000^{th}$ range, e.g., by up to 12 to 16 μm. It is also advantageous to round the PCD-plated cutting inserts on the edges or provide them with a round chamfer.

Instead of allocating each blade of the blade sets 30, 32, 34 and 36 with its own coolant/lubricant supply opening, it may in some instances also be enough to supply several blades via a single opening.

The previously outlined drilling finishing tool configured as a stepped reamer was described above as a rotationally driven tool. However, it is likewise possible to have the tool stand in place, and perform the machining operation by rotating the work piece.

The tool described above has six blades distributed uniformly over the circumference. However, the number of blades can be varied within broad limits, although an even number of blades is advantageously selected. Apart from that, the invention can also offer the advantages described above even when the angular distances of the blades distributed over the circumference are not precisely the exact same size.

Described above were embodiments of to used in a single operation for machining stepped bores. However, all of the advantages can also be realized by the invention if just a single blade set is present, and an axially offset guiding strip set configured according to the invention is allocated thereto.

As a consequence, the invention provides a multi-blade cutting and drilling finishing tool, in particular a reamer, for machining deep, in particular stepped bores. It has a blade set with a predetermined nominal diameter, and blades distributed essentially uniformly over the circumference. In order to improve the axially centered guidance of the tool, the blade set has lying behind it in the advancing direction a guiding strip set in the form of very accurately positioned and preferably cylindrically ground cutting inserts, which each are aligned with one of the blades of the blade set adjacent in a direction parallel to an axis of the tool, and which each have a nominal diameter that is smaller than the nominal diameter of the blade set by essentially twice the lubrication gap that forms when using the tool.

The invention claimed is:

1. A multi-blade cutting and drilling finishing tool or fine machining tool for machining deep or stepped bores, the tool comprising:
    a first blade set having a first nominal diameter and blades distributed essentially uniformly over the circumference;
    a guiding strip set axially behind the first blade set with respect to the axial direction of the tool in which the tool advances forward to machine deep or stepped bores, the guiding strip set comprising very accurately positioned supporting inserts, each supporting insert aligned with one of the blades of the first blade set in a direction parallel to an axis of the tool, the guiding strip set having a second nominal diameter that is smaller than the first nominal diameter by essentially twice the lubrication gap that forms between the guiding strip set and the deep or stepped bores when using the tool; and
    a second blade set behind the guiding strip set in the advancing direction, the second blade set having a third nominal diameter, the third nominal diameter being larger than the first nominal diameter.

2. The drilling finishing tool according to claim 1, wherein the nominal diameter of the guiding strip set is smaller than the nominal diameter D of the first blade set by an amount within a range of between 0.0006 and 0.0016×D.

3. The drilling finishing tool according to claim 1, wherein the axial length of the supporting inserts of the guiding strip set is on the order of the axial length of the first blade set.

4. The drilling finishing tool according to claim 1, wherein the tool is modular in design.

5. The drilling finishing tool according to claim 4, wherein the guiding strip set and the first blade set are formed on a first tool module that is detachably connected with a second tool module, which has a clamping section for centered coupling to a tool holder or module of a tool system.

6. The drilling finishing tool according to claim 5, wherein the first tool module further comprises a second blade set with a nominal diameter of the second blade set differing from the nominal diameter of the first blade set.

7. The drilling finishing tool according to claim 5, wherein the second tool module carries a second blade set, the second blade set having a nominal diameter greater than the nominal diameter of the first blade set in the advancing direction of the tool.

8. The drilling finishing tool according to claim 1, wherein each of the at least a first blade set has 6 blades uniformly distributed over the circumference.

9. The drilling finishing tool according to claim 1, wherein the supporting inserts of the guiding strip set and/or at least one of the at least a first blade set are comprised of polycrystalline diamond fitted cutting tips.

10. The drilling finishing tool according to claim 9, wherein the supporting inserts have a thickness ranging between 0.75 and 1.5 mm, and a thickness of the polycrystalline diamond cutting tip measures about 0.5 mm.

11. The drilling finishing tool according to claim 1, wherein the supporting inserts of the guiding strip set and/or the blades of at least one of the at least a first blade set are aligned in a direction parallel to an axis of the tool.

12. The drilling finishing tool according to claim 1, wherein the tool further comprises an internal coolant/lubricant supply.

13. The drilling finishing tool according to claim 12, wherein at least one opening of the coolant/lubricant supply is allocated to the blades of at least one of the at least a first blade set.

14. The drilling finishing tool according to claim 5, wherein the clamping section exhibits a centering extension or hollow shank taper and a clamping flange resting perpendicularly on the centering axis for centered coupling to a tool holder of a tool system or tool system module.

15. The drilling finishing tool according to claim 1, wherein a secondary cutting edge clearance angle of the supporting inserts of the guiding strip set measures about 0°.

16. The drilling finishing tool according to claim 1, wherein the axial distance between the guiding strip set and the first blade set in the advancing direction lies between 0.1 and 0.3×D wherein D denotes the nominal diameter of the first blade set.

17. The drilling finishing tool according to claim 1, wherein the supporting inserts are cylindrically ground.

18. The drilling finishing tool according to claim 1, wherein the nominal diameter of the guiding strip set is smaller than the nominal diameter D of the first blade set by an amount within a range of between 0.008 and 0.0014×D.

19. The drilling finishing tool according to claim 1, wherein the axial distance between the guiding strip set and the first blade set in the advancing direction lies between 0.15 and 0.25×D, wherein D denotes the nominal diameter of the blade set.

* * * * *